US011364662B2

(12) United States Patent
Starkey et al.

(10) Patent No.: US 11,364,662 B2
(45) Date of Patent: Jun. 21, 2022

(54) LIFTER SYSTEM WITH ROTATIONAL GIB

(71) Applicant: PROGRESSIVE COMPONENTS INTERNATIONAL CORPORATION, Wauconda, IL (US)

(72) Inventors: Glenn Starkey, Wauconda, IL (US); Kevin Alan Kelly, Yakima, WA (US)

(73) Assignee: PROGRESSIVE COMPONENTS INTERNATIONAL CORPORATION, Wauconda, IL (US)

( * ) Notice: Subject to any disclaimer, the term of this patent is extended or adjusted under 35 U.S.C. 154(b) by 1 day.

(21) Appl. No.: 17/064,257

(22) Filed: Oct. 6, 2020

(65) Prior Publication Data

US 2021/0107184 A1  Apr. 15, 2021

Related U.S. Application Data

(60) Provisional application No. 62/914,760, filed on Oct. 14, 2019.

(51) Int. Cl.
*B29C 33/44* (2006.01)
*F16C 11/10* (2006.01)

(52) U.S. Cl.
CPC ............ *B29C 33/442* (2013.01); *F16C 11/10* (2013.01)

(58) Field of Classification Search
CPC .......... B29C 33/442; B29C 2045/4036; B29C 45/401; B29C 2045/4021;
(Continued)

(56) References Cited

U.S. PATENT DOCUMENTS 2,481,717 A * 9/1949 Hosea ................... F16M 11/10
396/428
3,338,086 A * 8/1967 Hunter .................... B25B 5/006
72/457
(Continued)

FOREIGN PATENT DOCUMENTS

CN  204773411 U  11/2015

OTHER PUBLICATIONS

U.S. Patent Office, English language version of the International Search Report, Form PCT/ISA/210 for International Application PCT/US2020/055362, dated Jan. 8, 2021 (3 pages).
(Continued)

*Primary Examiner* — Matthew J Daniels
(74) *Attorney, Agent, or Firm* — Pauley Erickson & Swanson

(57) ABSTRACT

A lifter system and apparatus having a rotational gib for molding plastic parts, in large mold machines or small mold machines. A core blade is movably mounted with respect to a mold. A gib, such as a rotational gib, is mounted with respect to an ejector plate of the mold. A rotational mount is fixed with respect to the gib. The core blade can be moved and releasably locked at or into different positions with respect to the gib. The rotational mount can be releasably locked with respect to the gib. A detent, a bias element and a spherical surface or other contact surface can be used to hold or fix a position of the core blade with respect to the gib. A second detent, a second bias element and a second spherical surface or other contact surface can be used to hold or fix a position of the rotational mount with respect to the gib.

15 Claims, 8 Drawing Sheets

(58) Field of Classification Search
CPC .... B29C 2045/4031; B29C 2045/4042; B29C 2045/4073; B29C 2045/4078; B29C 2045/4094
See application file for complete search history.

(56) References Cited

U.S. PATENT DOCUMENTS

| | | | | |
|---|---|---|---|---|
| 3,807,682 A * | 4/1974 | Catinella | B29C 33/442 | 425/444 |
| 3,893,644 A * | 7/1975 | Drazick | B29C 33/442 | 425/444 |
| 5,226,622 A * | 7/1993 | LeAnna | F16M 13/02 | 248/219.2 |
| 5,281,127 A * | 1/1994 | Ramsey | B29C 45/4435 | 425/557 |
| 5,316,467 A | 5/1994 | Starkey | | |
| 5,551,864 A * | 9/1996 | Boskovic | B29C 45/4435 | 425/444 |
| 5,814,357 A * | 9/1998 | Boskovic | B29C 45/4435 | 264/318 |
| 6,491,513 B1 * | 12/2002 | Schneider | B29C 45/4435 | 425/DIG. 58 |
| 6,655,952 B1 * | 12/2003 | Kraft | B29C 45/4435 | 264/318 |
| 7,435,079 B2 * | 10/2008 | Wang | B29C 45/4005 | 264/318 |
| 8,029,267 B2 * | 10/2011 | Takao | B29C 45/4435 | 425/444 |
| 2003/0178289 A1 * | 9/2003 | Garbagnati | B29C 33/442 | 198/852 |
| 2017/0297230 A1 | 10/2017 | Sorimoto | | |
| 2017/0320249 A1 | 11/2017 | Wieder | | |
| 2017/0355118 A1 | 12/2017 | Starkey et al. | | |

OTHER PUBLICATIONS

U.S. Patent Office, English language version of the Written Opinion of the ISA, Form PCT/ISA/237 for International Application PCT/US2020/055362, dated Jan. 8, 2021 (9 pages).

* cited by examiner

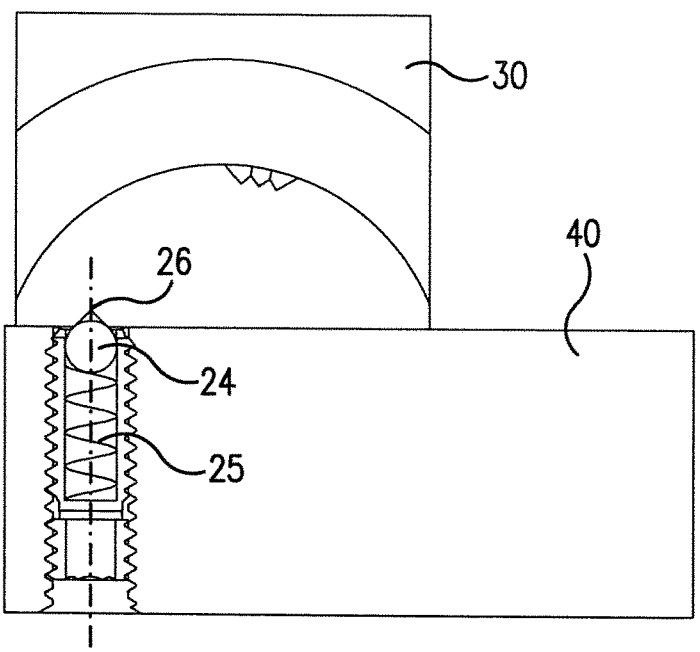
FIG. 10
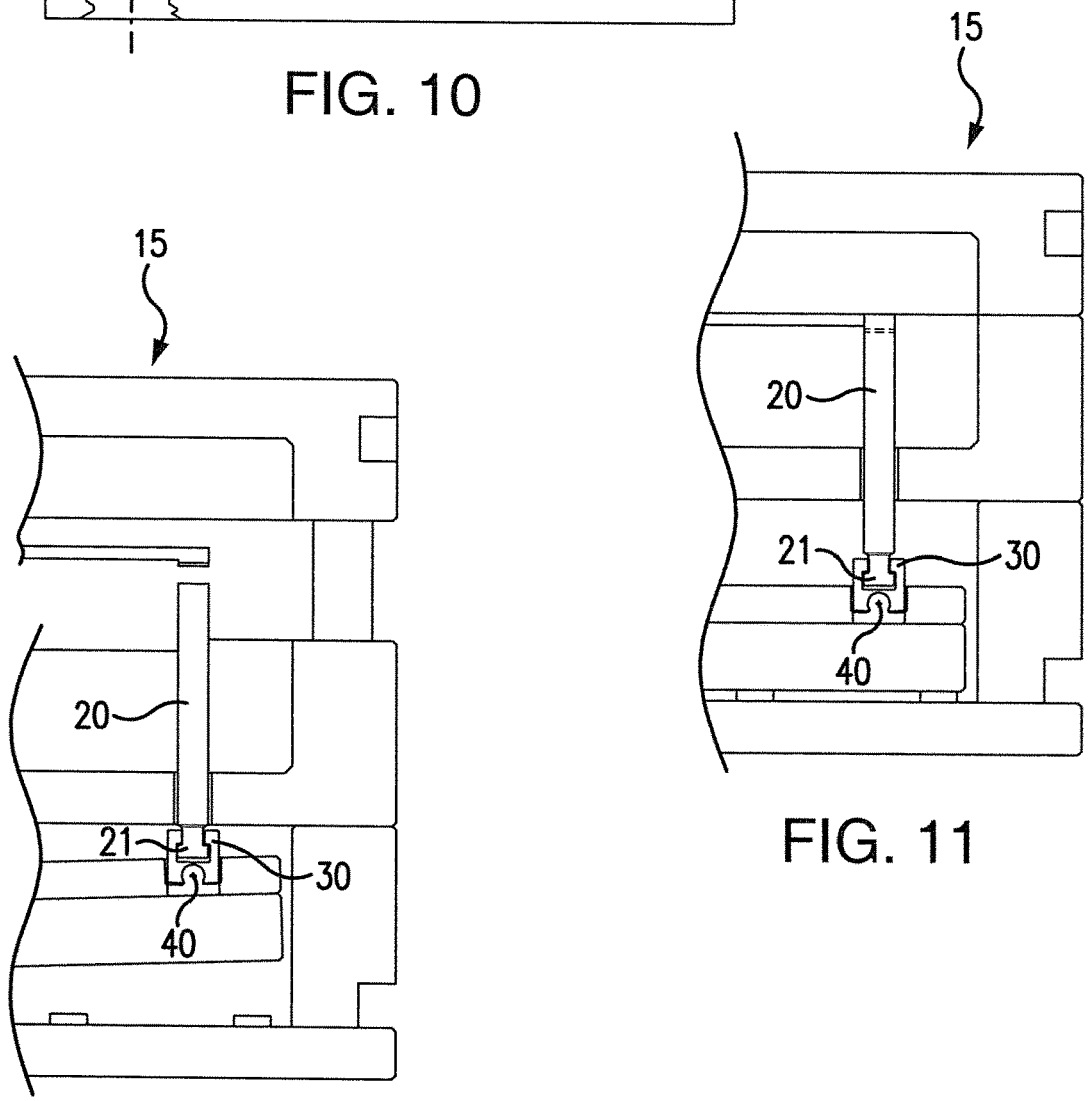
FIG. 11
FIG. 12

LIFTER SYSTEM WITH ROTATIONAL GIB

CROSS REFERENCE TO RELATED APPLICATION

This application claims the priority benefit of U.S. Provisional Patent Application Ser. No. 62/914,760, filed on 14 Oct. 2019, and this U.S. Provisional Patent Application, in its entirety, is hereby incorporated by reference herein and is made a part of this specification, including but not limited to those portions which specifically appear hereinafter.

BACKGROUND OF THE INVENTION

Field of the Invention

This invention relates to a lifter system with a cylindrical gib that allows rotational travel within the lifter system, with detent features to assist in mold assembly.

Discussion of Related Art

There are several different lifter designs in the market, and each one addresses specific and different molding conditions. For example, some conventional lifters are for relatively small molds and release a relatively small undercut with a sprung core approach, requiring no angled machining. Conversely, other conventional lifters are for relatively larger molds with relatively large undercuts and these lifters require extensive angled machining within the mold. In both examples, however, assembly can become difficult because the ejector systems of the molds can become crowded and cumbersome to reach and assemble by a mold technician.

Lifters that are made of sliding pieces can disengage and fall during the often cumbersome assembly stage, which can be frustrating and time-consuming. For large molds, assembly often requires two people, one person to load the core lifter from one side and another person to receive and guide the core blade into a mating ejector base and gib assembly, and with two people assembling a single mechanism while they are on opposite sides of a large mold block, is also cumbersome and time consuming. To address this assembly difficulty when parts slide and fall during assembly, one of Applicant's designs contains a first detent to secure the adjoining lifter mechanism part, or ejector base, at the angle of the incoming core blade during the first assembly step, and then a second detent to position the ejector base in the position or location where the core blade and ejector base will be positioned when the mold is assembled and the plates are in position to begin operation.

Once the mold is in operation, the bushings that guide ejector plates can become worn, and the plates are then misaligned and thus operate sloppily. When this occurs, lifter core blades are then bent or are deformed and can experience undue wear, gall, and some components then can break or fracture. In other designs, the Y-axis travel occurs not in the gib but in a two-piece core blade. In either case, this combination of rotationally rocking and Y-axis sliding compensates for the non-parallelism occurring with sloppy or loose plates and eliminates the pressure on the core blade, thereby eliminating the bending, galling and other similar problems.

Current conventional systems have a common problem, and that is the amount of space they take within the mold. For example, a footprint of one conventional design is significantly wider than the core blade, and this can create some problems in the field, such as molds being crowded with different ejector pins, support pillars and other similar components.

SUMMARY OF THE INVENTION

To address the wide footprint issue, it is possible to use with a lifter design a system in which lifter gib components do not exceed a width of the core blade. For example, at the union of the CT-Coupling and the T-Gib, it is possible to convert the T-shaped dovetail into a cylinder or cylindrical assembly, for example, to allow rotational travel and form a new gib, such as a C-Gib. To achieve travel in the Y-axis direction, a clearance can be provided between the core blade and the radial dovetail surface of the coupling. It is thus possible, with core blade assemblies according to this invention, to achieve a compensation for sloppy ejector plates.

In some embodiments of this invention, a 2-detent design has one detent at a bottom of the core blade and another detent within the C-Gib. In some embodiments of this invention, this particular design is completely compatible with conventional lifter designs which have been in the market and sold globally. Thus, if a mold is problematic and experiencing lifter wear, components can be interchanged, swapped-out and/or retrofitted without requiring any machining to the mold base. Also, in some embodiments, this invention can be used to retrofit or rebuild conventional systems that have a product with the rotational and Y-axis movement, but in some embodiments of this invention this is positioned in a better position or location, compared to other conventional dovetailed core blades.

Also, with the design of this invention, detents can be positioned to assist in mold assembly, not only in relatively large applications, but with this invention also within relatively small lifters for relatively small molds.

BRIEF DESCRIPTION OF THE DRAWINGS

Different objects of this invention can be accomplished with certain lifter systems having a rotational gib, according to different embodiments of this invention, wherein:

FIG. 10 shows a side view of a detent for a C-Gib and a C-Coupling, according to one embodiment of this invention;

FIG. 11 shows a front view of a lifter core blade and a rotational gib mounted to a closed mold, according to one embodiment of this invention;

FIG. 12 shows a front view of a lifter core blade and a rotational gib mounted to an open mold, according to one embodiment of this invention;

DETAILED DESCRIPTION OF THE INVENTION

Starkey et al., U.S. Pat. No. 10,220,556, the entire disclosure of which is incorporated into this specification by reference thereto, describes a molded undercut release apparatus which includes a module or unit manufactured to allow a simplified installation of a lifter rod assembly of a core lifter apparatus for a mold for molding plastic parts.

Figure 9:
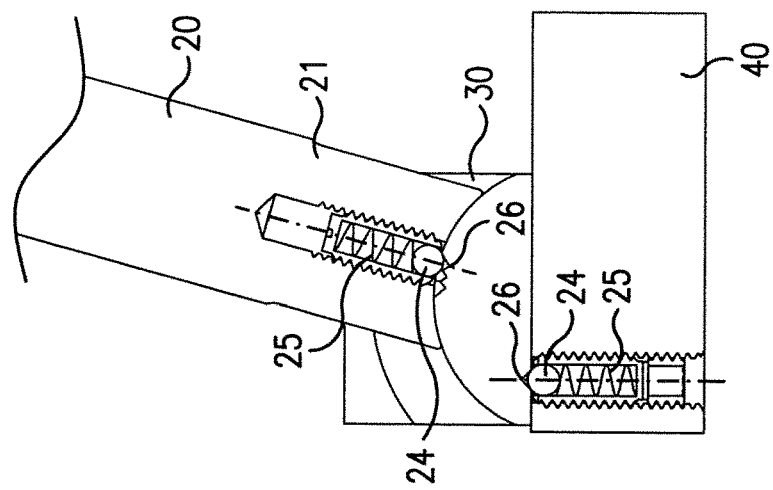
FIG. 9 shows a side view of a detent for a lifter core blade in about a 15° position or orientation and a rotational gib mounted to a mold, according to one embodiment of this invention.
Figure 8:
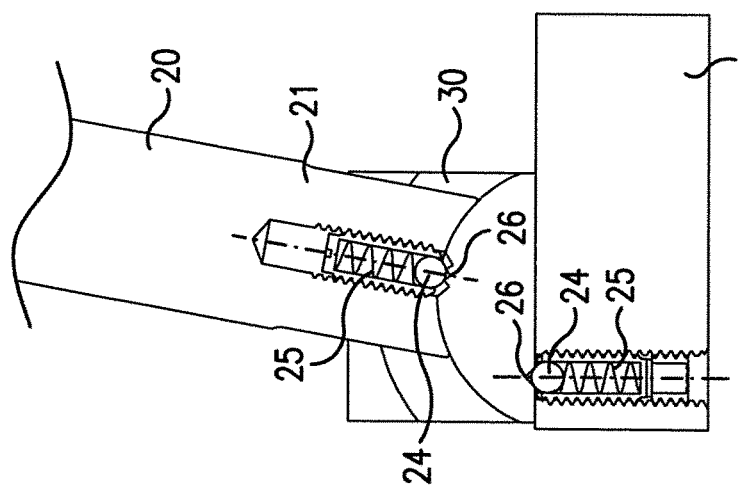
FIG. 8 shows a side view of a detent for a lifter core blade in about a 10° position or orientation and a rotational gib mounted to a mold, according to one embodiment of this invention.
Figure 7:
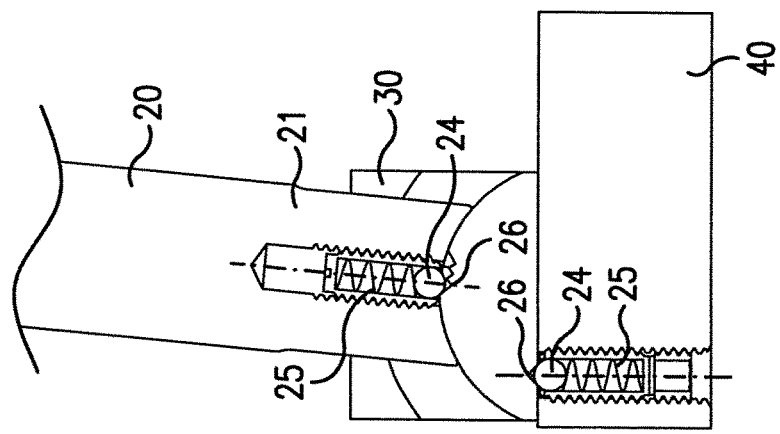
FIG. 7 shows a side view of a detent for a lifter core blade in about a 5° position or orientation and a rotational gib mounted to a mold, according to one embodiment of this invention.
Figure 13:
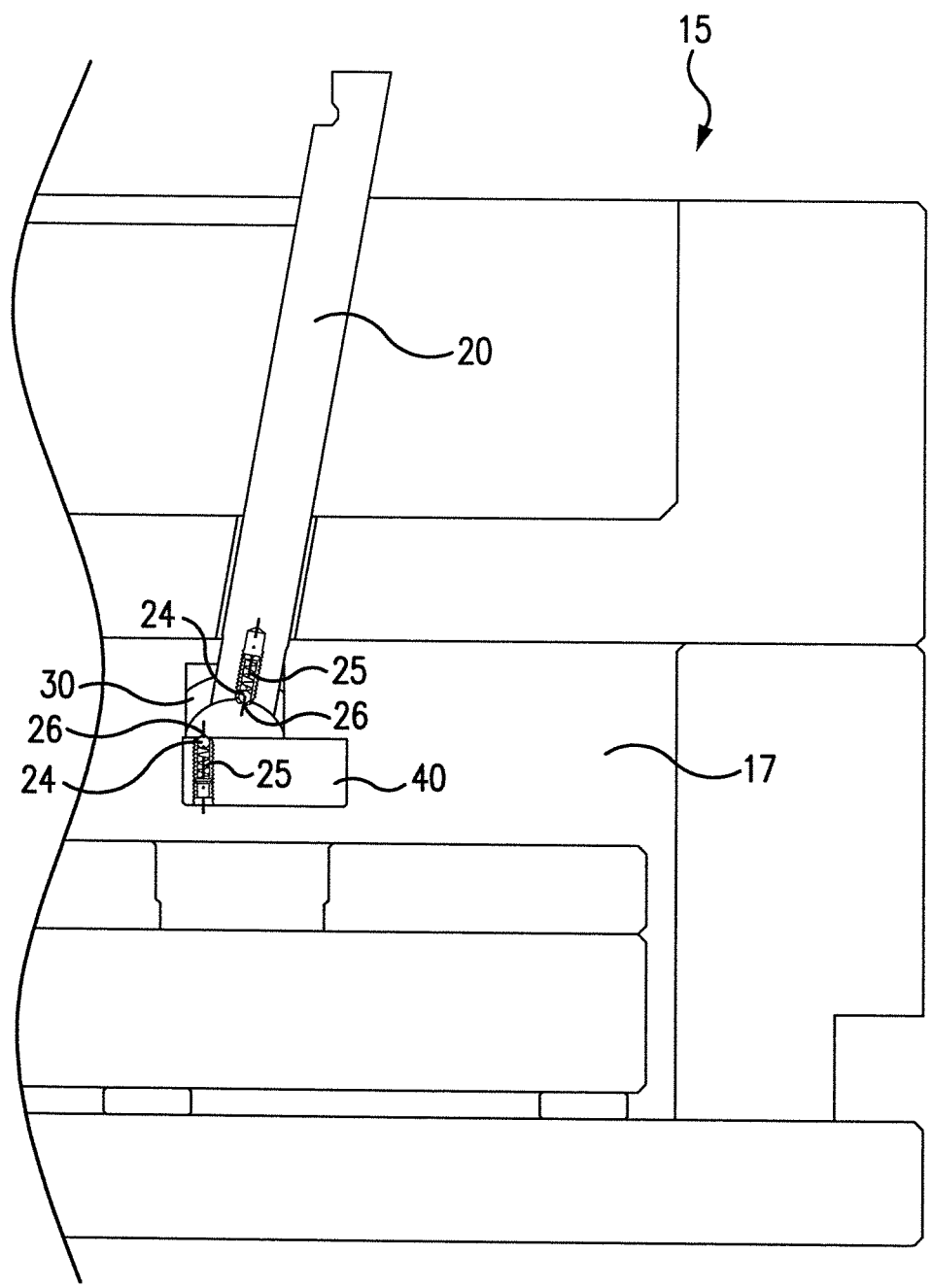
FIG. 13 shows a side view of a lifter core blade and 2 detent assemblies mounted to a closed mold, according to one embodiment of this invention.

FIGS. 1 and 3-9 show different embodiments of this invention of core blade 20 having end portion 21 mounted within opening 31 of C-Gib 30. As shown in FIGS. 3-12, core blade 20 can move or is movable in any suitable direction, for example, in a vertical direction as core blade 20 traverses along a horizontal direction or a generally horizontal movement, such as shown in FIGS. 3-9. In some embodiments of this invention, this particular feature allows mold 15 to self-align itself, such as shown between movements of the mold as illustrated by FIGS. 11 and 12. FIG. 11 shows mold 15 operating in a closed position or condition. FIG. 12 shows mold 15 operating in an open position or condition. As mold 15 moves between the open and closed positions, core blade 20 can move or be in a position to create an angle between or with respect to C-Gib 30 and/or rotational mount 40, for example, as shown in FIGS. 7-9. In other embodiments according to this invention, C-Gib 30, opening 31 of C-Gib 30, rotational mount 40 and/or cylindrical portion 41 can have any other suitable shape, size and/or design and still produce, accommodate or result in similar movements of core blade 20, C-Gib 30 and/or rotational mount 40, particularly normal operational movements as mold 15 opens and closes.

FIGS. 6-10, 14 and 15 show other views of the self-aligning feature and assembly of core blade 20 and C-Gib 30, according to some embodiments of this invention. As shown in FIGS. 6-10, core blade 20 can be moved and/or adjusted into different angular positions and then locked into place by using, for example, spring 25 acting on or forcing ball 24 into a spring-loaded position that urges and/or forces ball 24 to securely lock and/or releasably lock within one or more corresponding detents 26, such as formed within a body structure of C-Gib 30 and/or rotational mount 40. In some embodiments of this invention, ball 24, spring 25 and/or detent 26 can be interchanged with or replaced by any other suitable element, system or device that allows core blade 20 to move in a desired direction, such as in a vertical direction and/or a rotational direction, particularly so that core blade 20 can be moved, locked and/or releasably locked into position with respect to C-Gib 30 and/or rotational mount 40 of mold 15.

Figure 15:
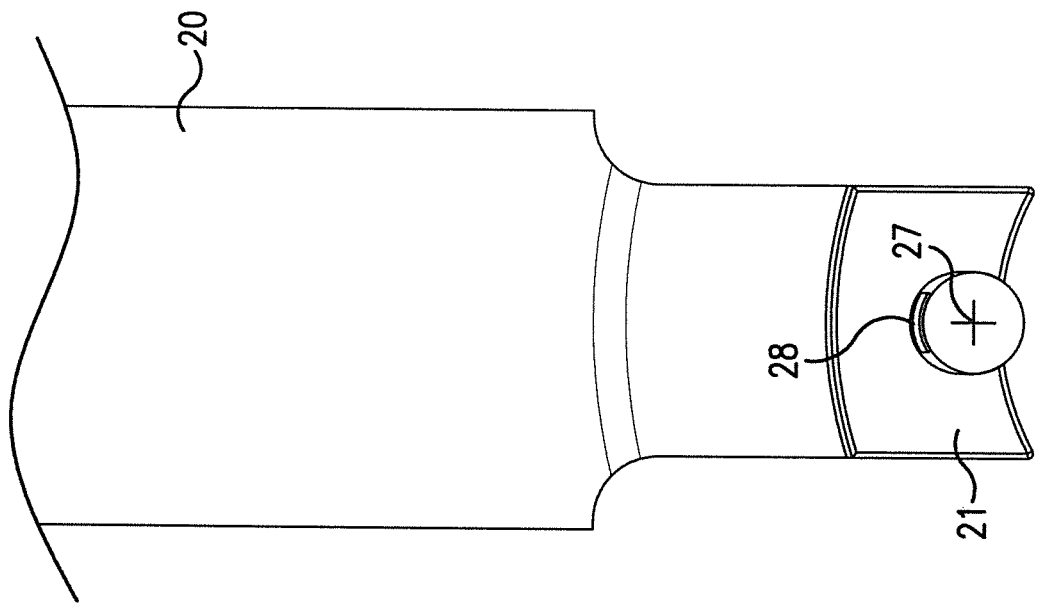
FIG. 15 shows a side view of a lifter core blade having a roller movably mounted with respect to the core blade, as shown in FIG. 14.
Figure 14:
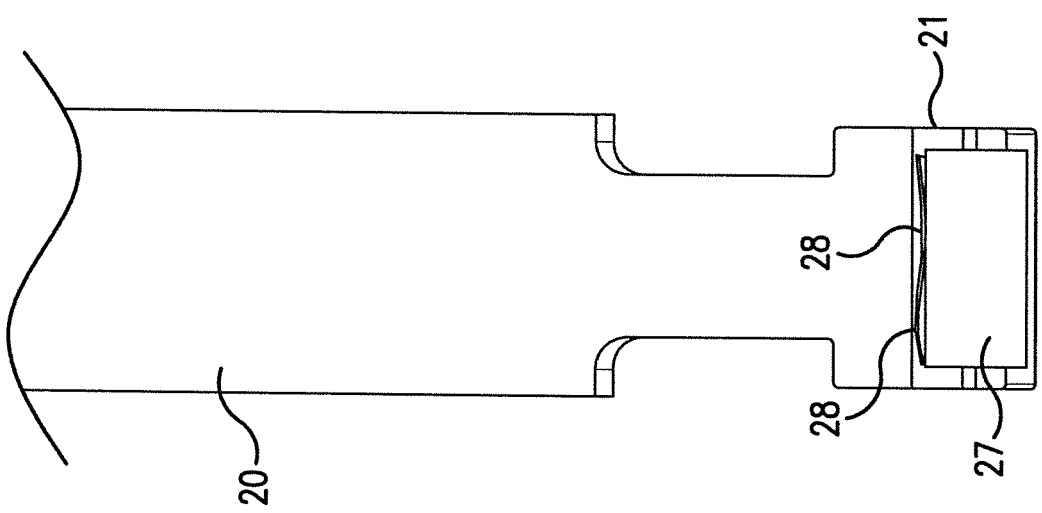
FIG. 14 shows a partial sectional front view of a lifter core blade having a roller movably mounted with respect to the core blade, according to one embodiment of this invention.

For example, in some embodiments of this invention, ball 24 and spring 25 is replaced by roller 27 and spring 28, such as shown in FIGS. 14 and 15, and spring 28 can act on or force roller 27 into a position within and/or to engage with detent 26, so that core blade 20 can move in a desired direction, such as in a vertical direction and/or a rotational direction with respect to C-Gib 30 and/or rotational mount 40. In some embodiments of tis invention, roller 27 is engaged within detent 26 with enough force so that frictional contact forces allow core blade 20 to be moved and locked and/or releasably locked into a particular position with respect to C-Gib 30 and/or rotational mount 40.

In some embodiments according to this invention, roller 27 comprises a cylindrical body, such as shown in FIGS. 14 and 15, which can be movably and/or rotatably mounted with respect to core blade 20. In other embodiments according to this invention, roller 27 can include and/or be replaced by any other suitable movable contact surface, such as a curved surface and/or an arcuate surface, particularly that allows core blade 20 to move and lock and/or releasably lock into a particular position with respect to C-Gib 30 and/or rotational mount 40. In other embodiments according to this invention, roller 27 can include and/or be replaced by any other suitable rolling device and/or apparatus that allows core blade 20 to move and lock and/or releasably lock into a particular position with respect to C-Gib 30 and/or rotational mount 40.

In some embodiments according to this invention, spring 28 can be a leaf spring, a coil spring and/or any other suitable bias element that applies and/or generates a force, such as a spring force, for example, to urge or normally urge roller 27 into a position that engages with and/or is otherwise releasably held within detent 26.

As shown in FIGS. 7-9, core blade 20 can be moved and/or adjusted into different angular positions and then locked into place by using, for example, spring 28 acting on or forcing roller 27 into a spring-loaded position that urges and/or forces roller 27 and/or another suitable arcuate contact surface, to securely lock and/or releasably lock within one or more corresponding detents 26, such as formed within a body structure of C-Gib 30 and/or rotational mount 40.

In some embodiments according to this invention, FIGS. 7-9, 14 and 15 show different embodiments of how core blade 20 can be moved and/or locked or releasably locked into a fixed position with respect to C-Gib 30 and/or rotational mount 40. In some embodiments of this invention, first ball 24, first spring 25 and first detent 26 are used to move and securely lock and/or releasably lock a position of C-Gib 30 with respect to rotational mount 40. In some embodiments of this invention, second ball 24, second spring 25 and second detent 26 are used to move and securely lock or releasably lock a position of C-Gib 30 with respect to rotational mount 40. In some embodiments of this invention, 2 sets of detents are used, including first ball 24, first spring 25 and first detent 26 to move and securely lock and/or releasably lock a position of C-Gib 30 with respect to rotational mount 40, and also second ball 24, second spring 25 and second detent 26 to move and securely lock or releasably lock a position of core blade 20 with respect to C-Gib 30 and/or rotational mount 40.

In some embodiments according to this invention, spring 25 can be a leaf spring, a coil spring and/or any other suitable bias element that applies and/or generates a force, such as a spring force, for example, to urge or normally urge ball 24 into a position that engages with and/or is otherwise releasably held within detent 26.

FIG. 7 shows core blade 20 moved and releasably locked in about a 5° position or orientation with respect to C-Gib 30, rotational mount 40 and/or mold 15. FIG. 8 shows core blade 20 moved and releasably locked in about a 10° position or orientation with respect to C-Gib 30, rotational mount 40 and/or mold 15. FIG. 9 shows core blade 20 moved and releasably locked in about a 15° position or orientation with respect to C-Gib 30, rotational mount 40 and/or mold 15. In some embodiments of this invention, second ball 24, second spring 25 and second detent 26 can be used to move and securely hold or releasably hold and secure or fix a position C-Gib 30 with respect to rotational mount 40 and/or mold 15. In some embodiments of this invention, a force can be directly and/or indirectly applied to core blade 20 to move and/or lock core blade 20 into different positions or locations. In some embodiments of this invention, the applied force can be varied in magnitude and/or direction, as needed, to accommodate for differently sized mold machines, such as large mold machines or small mold machines.

Figure 1:
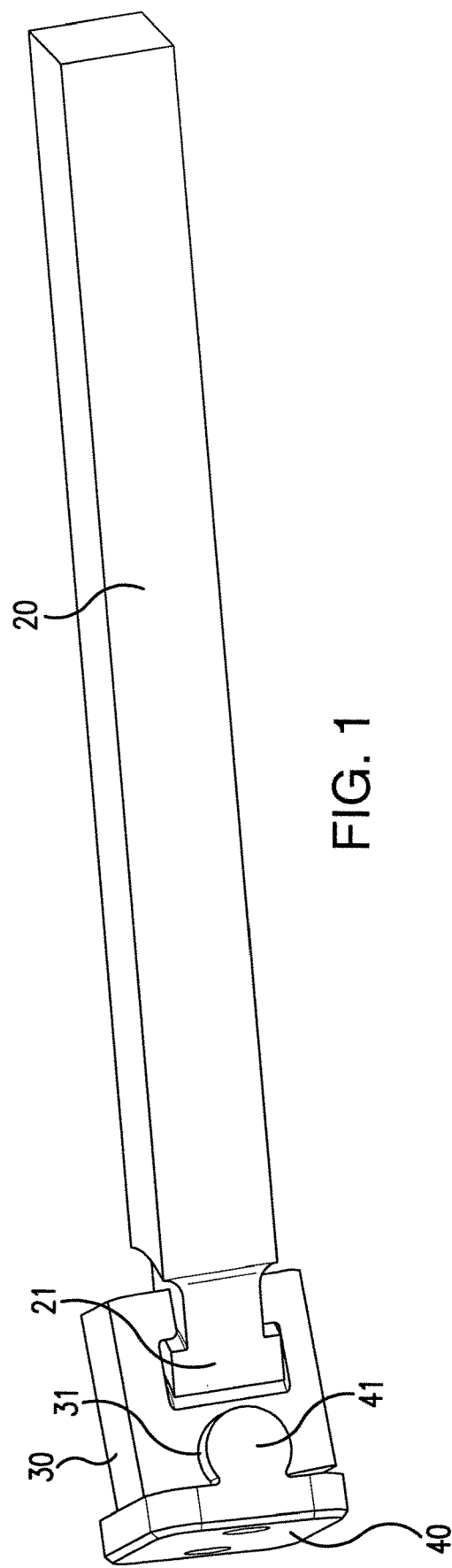
FIG. 1 shows a perspective front view of an assembly with a lifter core blade having a rotational gib, according to one embodiment of this invention.
Figure 2:
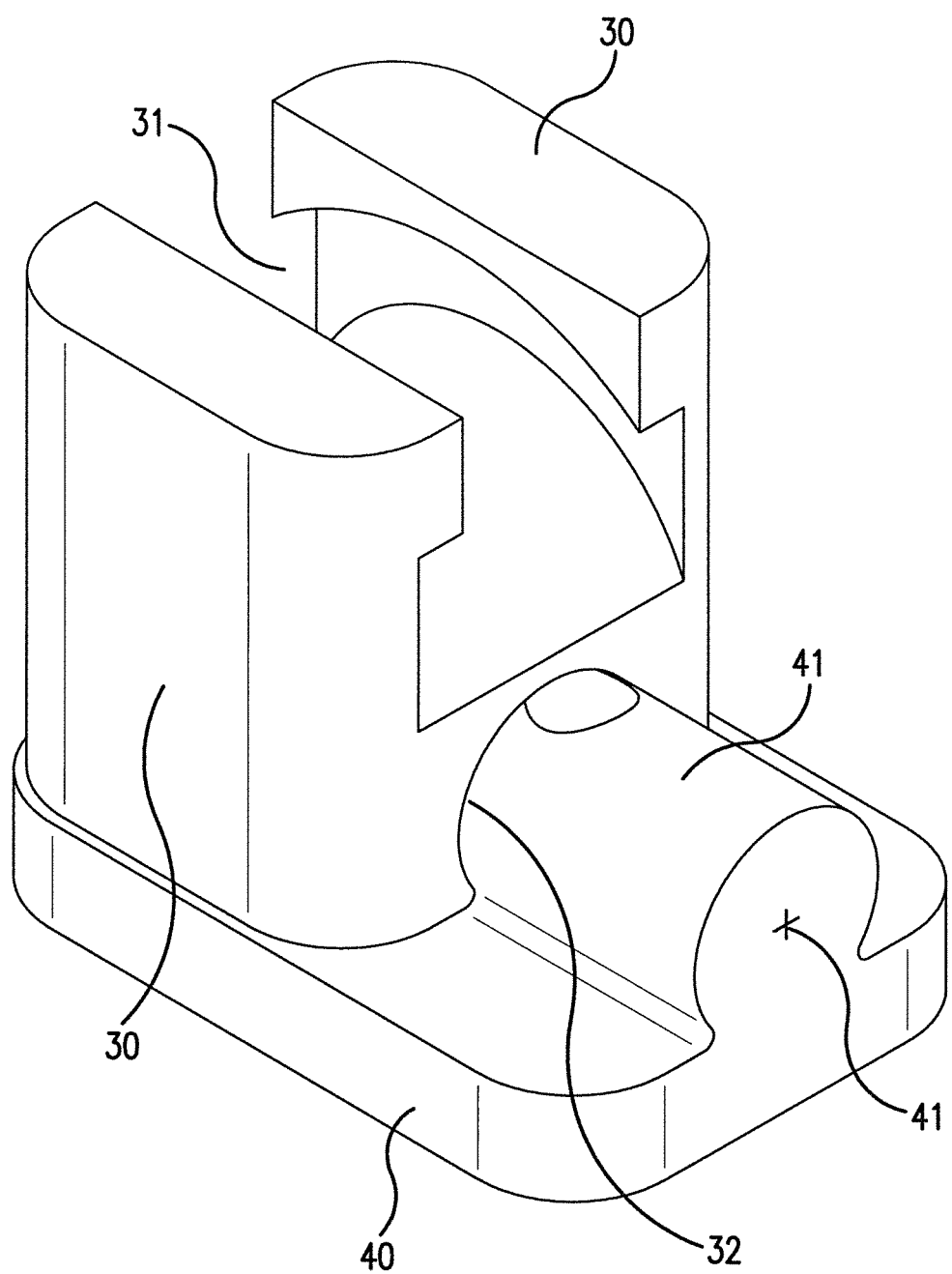
FIG. 2 shows a perspective view of a C-Gib mounted to a rotational mount, according to one embodiment of this invention.
Figure 5:
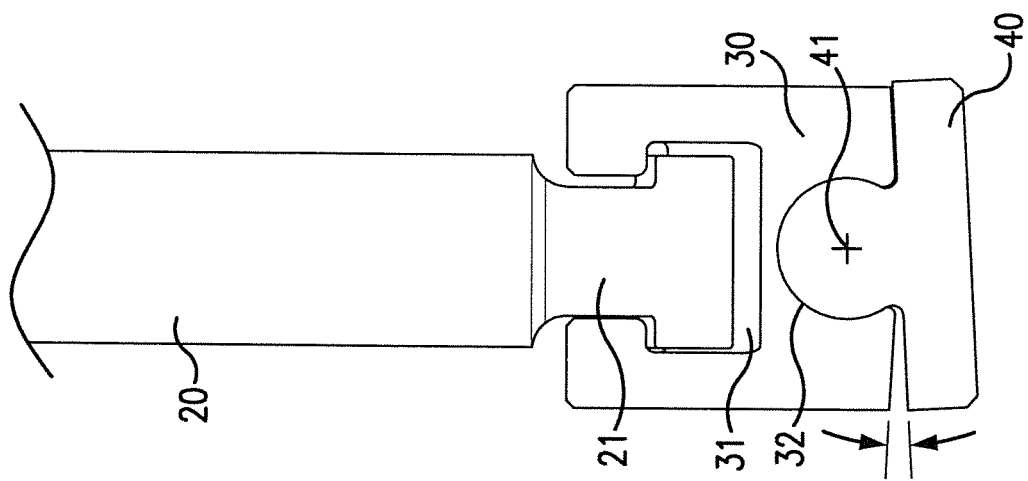
FIG. 5 shows a front view of an assembly having a lifter core blade in a position moved or shifted about 3° to the right from the neutral position, and having a rotational gib, according to one embodiment of this invention.
Figure 4:
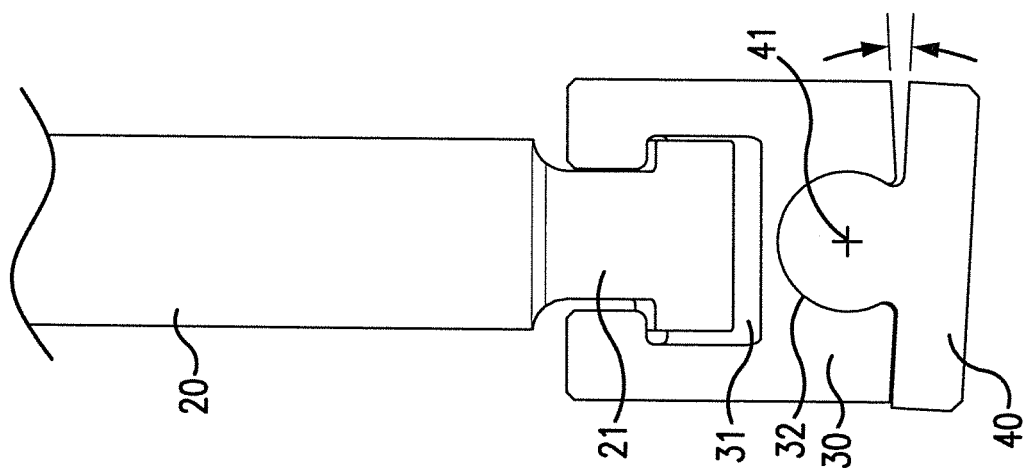
FIG. 4 shows a front view of an assembly having a lifter core blade in a position moved or shifted about 3° to the left from the neutral position, and having a rotational gib, according to one embodiment of this invention.
Figure 3:
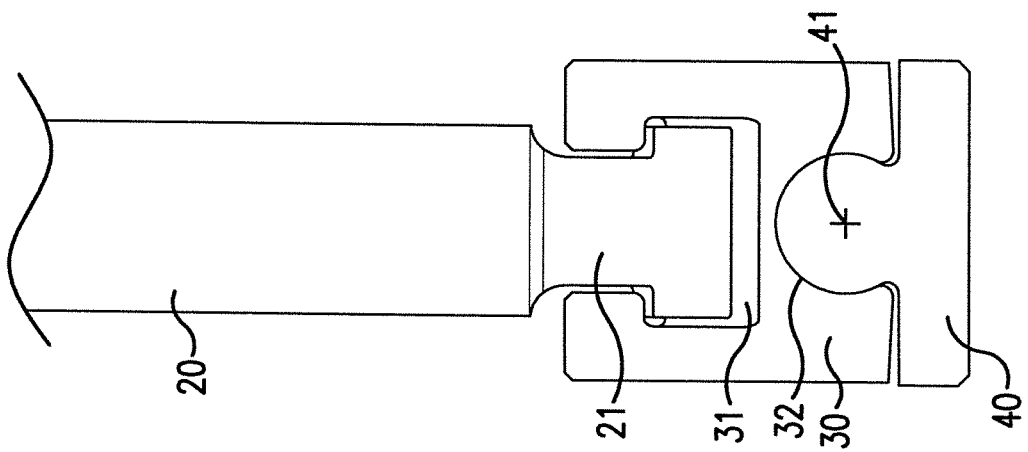
FIG. 3 shows a front view of an assembly having a lifter core blade in a neutral position and having a rotational gib, according to one embodiment of this invention.
Figure 6:
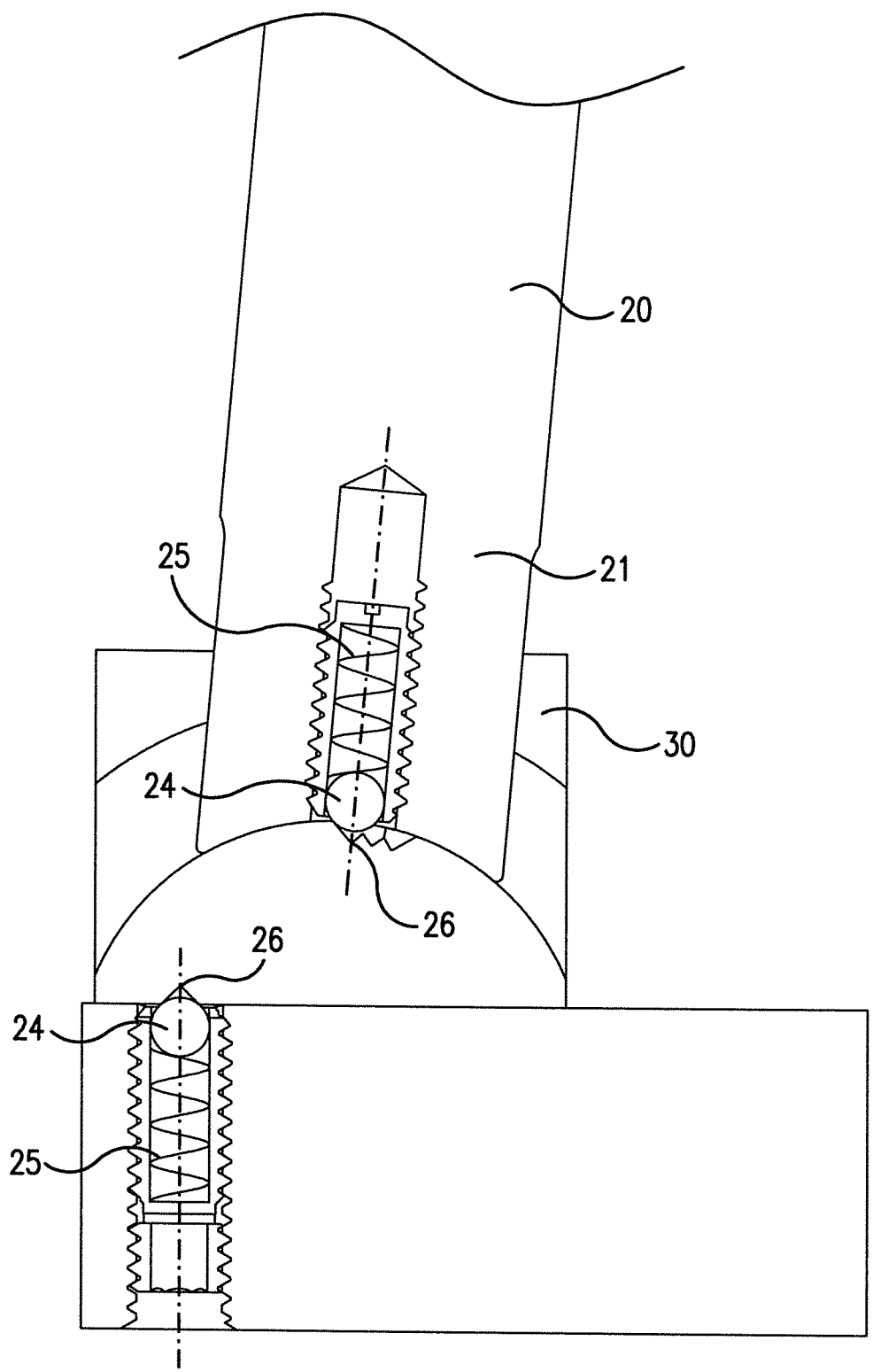
FIG. 6 shows a side view of a lifter core blade and a rotational gib mounted to a mold, according to one embodiment of this invention.

As shown in FIGS. 1 and 3-10, according to different embodiments of this invention, a pivotal or rotational joint is formed by rotational mount 40 housed, mounted and/or otherwise movably positioned within opening 32 of C-Gib 30. As shown in FIGS. 1 and 6-10, according to some embodiments of this invention, rotational mount 40 comprises cylindrical portion 41 mounted, housed and/or otherwise movably positioned within opening 32 of C-Gib 30. As shown in FIGS. 3-5, cylindrical portion 41 and the manner in which it mates within opening 32 allows C-Gib 30 to pivot, rotate and/or otherwise suitably move with respect to rotational mount 40. In some embodiments of this invention, such as shown in FIGS. 3-5, the rotation, such as illustrated by the arrow in FIGS. 4 and 5, is approximately 3° of rotation to the left or to the right, with respect to core blade 20 and/or C-Gib 30. In other embodiments of this invention, the rotation can be more rotation or less rotation. In some embodiments of this invention, this rotation reduces forces and stresses applied to core blade 20, C-Gib 30 and/or rotational mount 40, particularly as mold 15 moves between the open position and the closed position. In some embodiments of this invention, the shape, size and/or design of core blade 20, C-Gib 30, rotational mount 40 and/or cylindrical portion 41 can be varied to accommodate different movements of core blade 20, C-Gib 30, rotational mount 40 and/or cylindrical portion 41, particularly to smoothly and/or efficiently move mold 15 between the open position and the closed position.

FIGS. 1, 2 and 11-13 show different embodiments of the design, shape and proportional sizes of C-Gib 30 and rotational mount 40. It is apparent that other suitable designs, shapes and/or sizes can be used to accomplish similar mold movement results of this invention, particularly in view of the large size or small size of the mold machine.

In some embodiments of this invention, cylindrical portion 41 can have any other suitable design, size and/or shape that allows rotational mount 40 to pivot, rotate and/or otherwise suitably move with respect to C-Gib 30. In other embodiments of this invention, any other suitable mechanical structure can be used by itself or in combination with rotational mount 40 and/or C-Gib 30 to accomplish the desired pivotal, rotational and/or otherwise suitable movement with respect to core blade 20.

In some embodiments according to this invention, a gib, such as C-Gib 30 and/or any other suitable gib structure is mounted and/or releasably fixed into a position or location with respect to ejector plate 17, which can move between the closed position of mold 15 as shown in FIG. 11 and the open position of mold 15 as shown in FIG. 12. In some embodiments of this invention, C-Gib 30 and/or any other suitable gib structure can be mounted, secured, connected and/or otherwise fixed in position and/or releasably fixed in position to mount and/or fix C-Gib 30 and/or any other suitable gib structure with respect to ejector plate 17 and/or with respect to any other suitable component of mold 15.

While in the foregoing detailed description this invention has been described in relation to certain preferred embodiments thereof, and many details have been set forth for purposes of illustration, it will be apparent to those skilled in the art that this invention is susceptible to additional embodiments and that certain of the details described herein can be varied considerably without departing from the basic principles of this invention.

What is claimed is:

1. An apparatus for molding plastic parts, the apparatus comprising:
   a mold;
   an ejector plate;
   a lifter apparatus comprising:
      a mount positioned in the ejector plate;
      a gib releasably locked to the mount;
      a core blade releasably lockable at different positions with respect to said gib and movably mounted with respect to the mold.

2. The apparatus according to claim 1, wherein said core blade is movable and releasably lockable into and between a plurality of said different positions.

3. The apparatus according to claim 1, wherein at each said different position said core blade is at a different vertical height with respect to said gib.

4. The apparatus according to claim 1, wherein a bias element urges a contact surface into a detent to fix said core blade into one of said different positions to releasably hold said core blade with respect to said gib.

5. The apparatus according to claim 1, wherein said gib has a C-shape forming an opening and an end portion of said core blade is movingly mounted within said opening.

6. The apparatus according to claim 1, wherein said gib has a void and said mount has a portion movably mounted within said void.

7. The apparatus according to claim 6, wherein said portion has at least a partly cylindrical shape and said void of said gib has a corresponding shape to movably house said portion within said void.

8. The apparatus according to claim 1, wherein a first bias element urges a first contact surface into a first detent to fix said core blade into one of said different positions to releasably hold said core blade with respect to said gib, and a second bias element urges a second contact surface into a second detent to fix a position of said gib with respect to said mount.

9. The apparatus according to claim 1, wherein said gib forms an opening and an end portion of said core blade is movingly mounted within said opening, and said gib has a void and said mount has a portion movably mounted within said void.

10. An apparatus for molding plastic parts, the apparatus comprising:
   a mold;
   an ejector plate;
   a lifter apparatus comprising:
      a mount positioned in the ejector plate;
      a gib releasably locked to the mount and mounted to move between a closed position of the mold and an open position of the mold;
      a core blade releasably lockable into different positions with respect to the gib and movable with respect to the mold.

11. The apparatus according to claim 10, wherein a bias element urges a contact surface into a detent to fix said core blade into one of said different positions to releasably hold said core blade with respect to said gib.

12. The apparatus according to claim 10, wherein said gib has a C-shape forming an opening and an end portion of said core blade is movingly mounted within said opening.

13. The apparatus according to claim 10, wherein said gib has a void and said mount has a portion movably mounted within said void.

14. The apparatus according to claim 10, wherein a first bias element urges a first surface into a first detent to fix said core blade into one of said different positions to releasably hold said core blade with respect to said gib, and a second bias element urges a second surface into a second detent to fix a position of said gib with respect to said mount.

15. The apparatus according to claim 10, wherein said gib forms an opening and an end portion of said core blade is movingly mounted within said opening, and said gib has a void and said mount has a portion movably mounted within said void.

* * * * *